Figure 1:
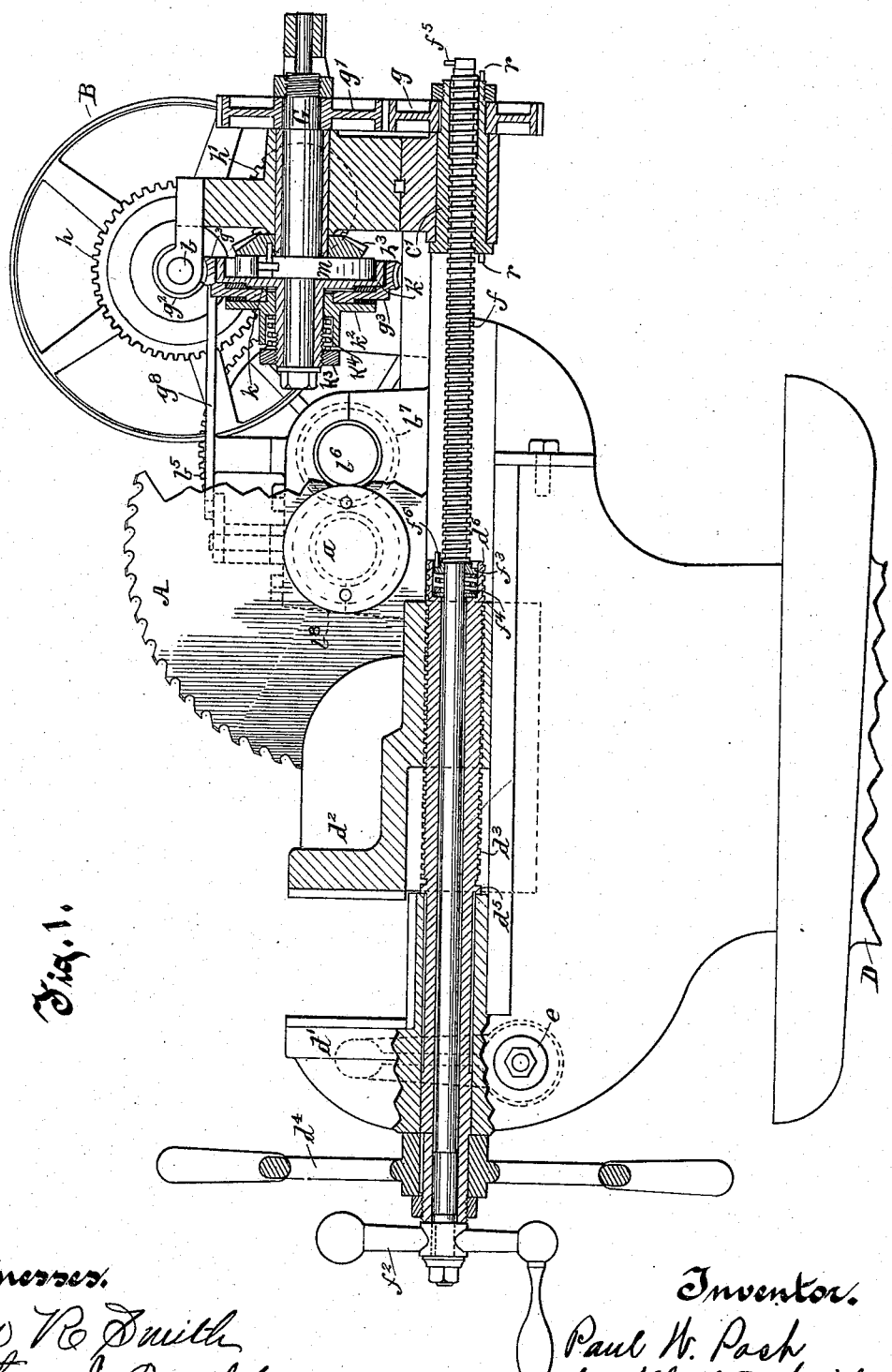

P. W. POST.
METAL CUT-OFF SAW.
APPLICATION FILED OCT. 31, 1906.

937,544.

Patented Oct. 19, 1909.
5 SHEETS—SHEET 1.

Witnesses.
Jno. R. Smith
Arthur J. Buckley

Inventor.
Paul W. Post
by Albert E. Smith.
Attorney.

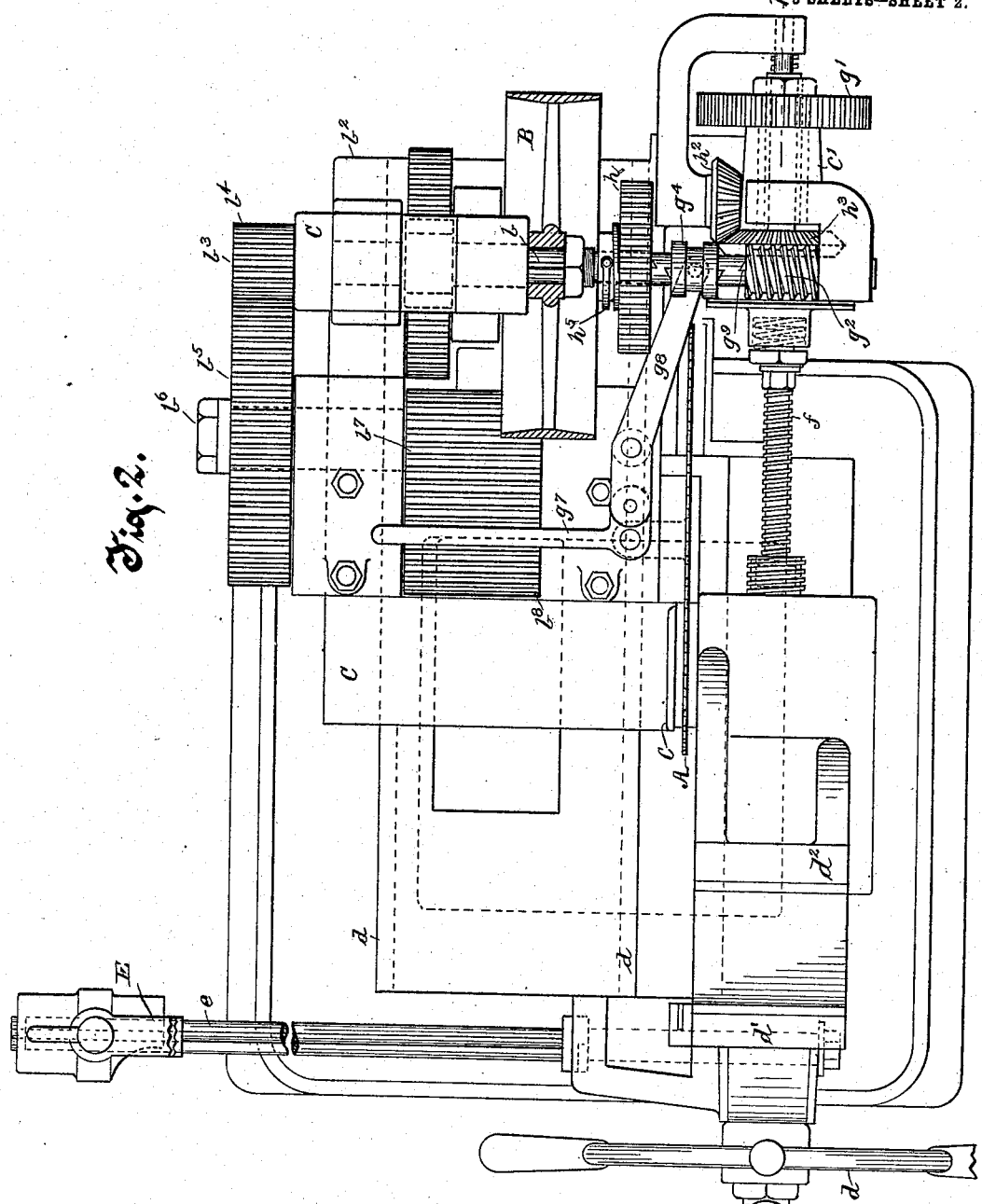

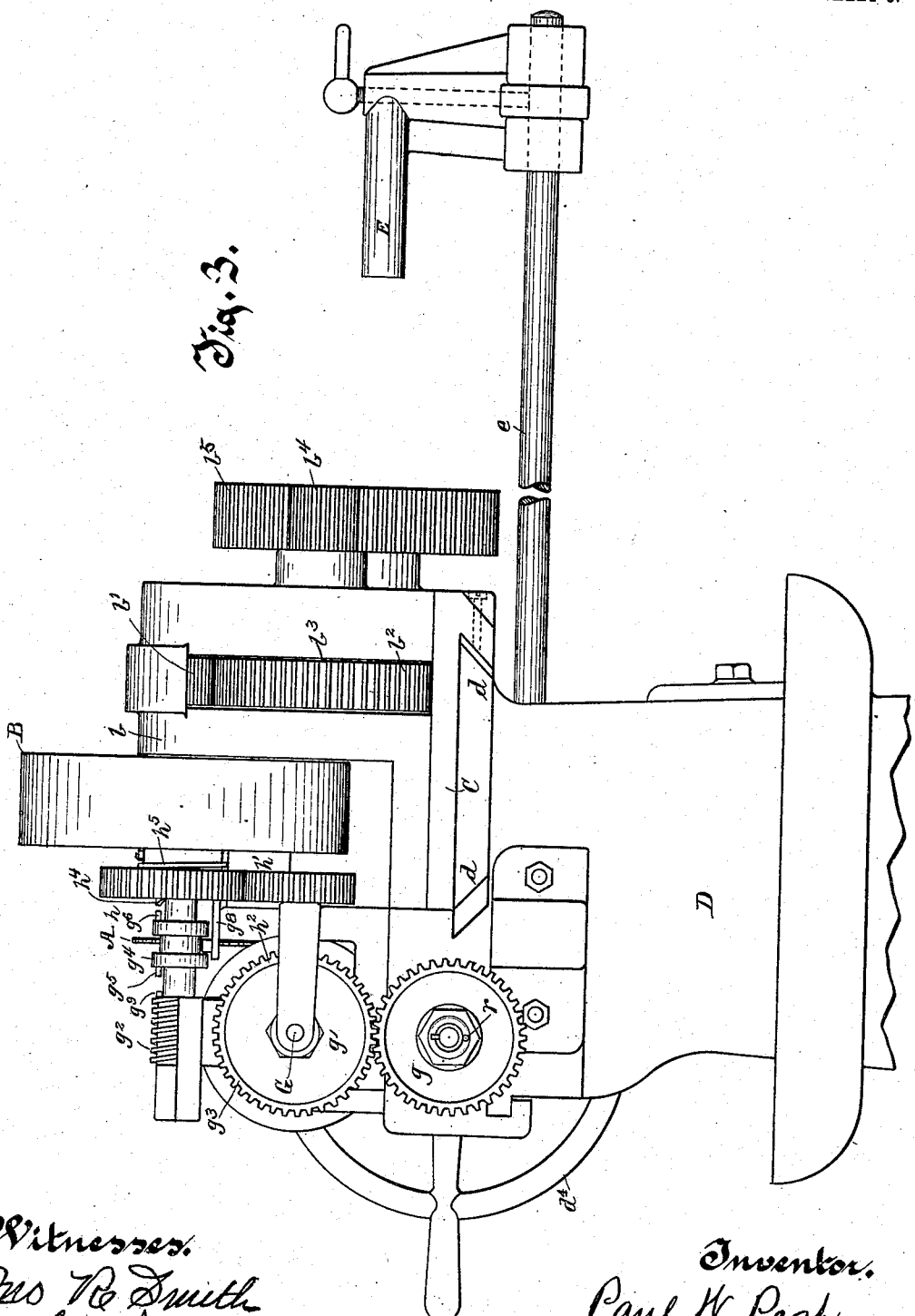

P. W. POST.
METAL CUT-OFF SAW.
APPLICATION FILED OCT. 31, 1906.
937,544.
Patented Oct. 19, 1909.
5 SHEETS—SHEET 4.
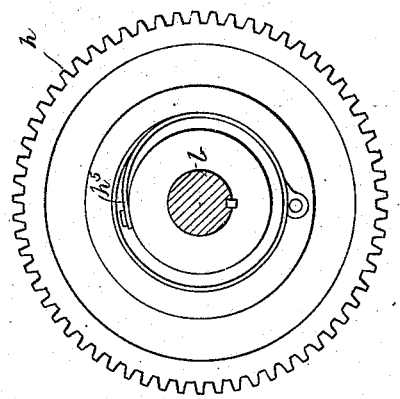
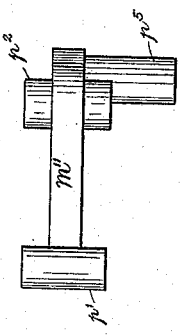
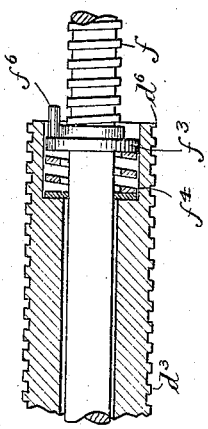
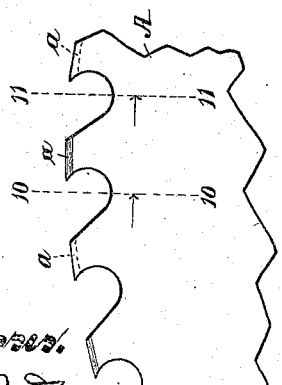
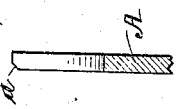
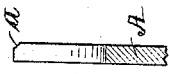
Witnesses:
Inventor.
Paul W. Post
by Albert E. Smith
Attorney.

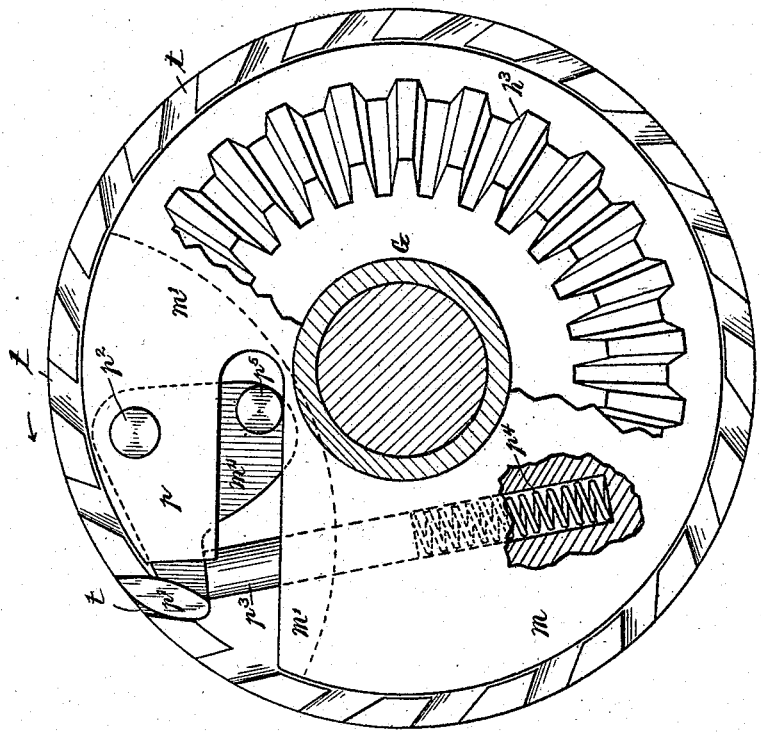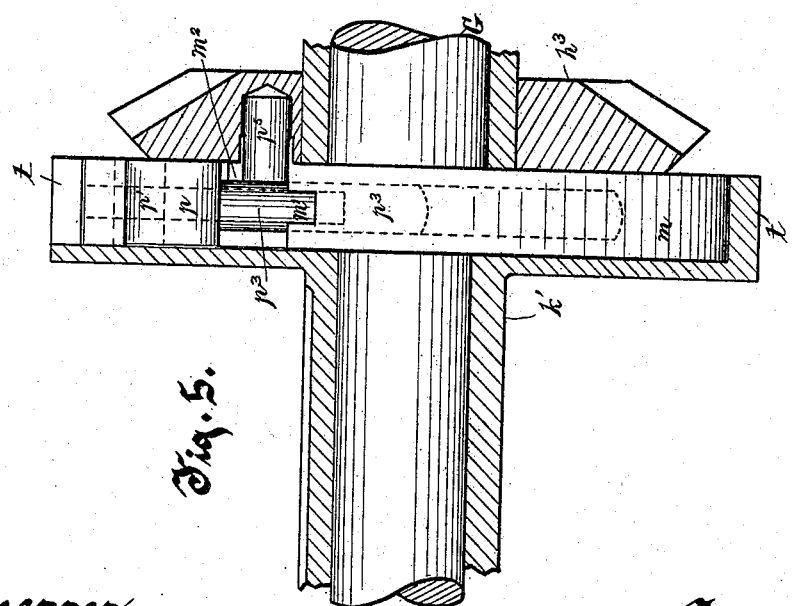

UNITED STATES PATENT OFFICE.

PAUL W. POST, OF MILWAUKEE, WISCONSIN, ASSIGNOR TO SMITH AND POST COMPANY, OF MILWAUKEE, WISCONSIN, A CORPORATION OF WISCONSIN.

METAL-CUT-OFF SAW.

937,544.

Specification of Letters Patent.

Patented Oct. 19, 1909.

Application filed October 31, 1906. Serial No. 341,506.

*To all whom it may concern:*

Be it known that I, PAUL W. POST, of Milwaukee, in the county of Milwaukee and State of Wisconsin, have invented a new and useful Improvement in Metal-Cut-Off Saws, of which the following is a specification.

My invention relates to improvements in metal cut-off saws, the objects of my improvement being to provide a saw that will stand a heavy feed, that will have an automatically adjusting feed, an automatic feed throw-out and a quick return. I attain these objects by the various features of construction shown in the accompanying drawings, which are hereby made a part of this application, and in which—

Figure 1 is a side elevation of the machine, showing the feeding and clamping devices in central longitudinal section, taken on the line 1—1 of Fig. 2, part of the saw being broken away. Fig. 2 is a plan view of the entire machine. Fig. 3 is a rear elevation of the entire machine. Fig. 4 is a detail view of the yielding gear for cushioning the engagement for the quick return feed. Figs. 5 and 6 show the feed disconnecting device in detail. Fig. 7 is a detail view of the pawl therefor. Fig. 8 is a detail view of the friction connection of the feed screw. Fig. 9 is a detail view of a fragment of the saw. Figs. 10 and 11 are sectional views thereof taken on the planes of sectional lines 10—10 and 11—11 of Fig. 9 respectively.

Similar letters refer to the same parts, throughout the several figures.

A is the saw and B is the pulley through which power is applied to the machine. The train of mechanism between B and A is traced as follows: B is mounted on the shaft, $b$, which also carries the pinion, $b^1$, which pinion meshes with the gear, $b^2$, mounted on shaft $b^3$. The pinion $b^4$, on shaft $b^3$, meshes with gear $b^5$ on the shaft $b^6$, whose wide faced pinion, $b^7$, engages with the equally wide faced pinion $b^8$ on the saw arbor $a$. It will be noticed that the speed is reduced from the shaft $b$ to $b^3$, and again from $b^3$ to $b^6$, and the face of the gears is inversely proportional to their speed. All of these parts are carried on the movable carriage C, which travels to and fro on the dove-tailed ways $d\ d$, on the top of the frame or column D.

The work is held between the stationary jaw, $d^1$, which is a part of the column D, and the movable jaw, $d^2$. This latter jaw is adjusted by means of the screw $d^3$, which is threaded in the jaw and is actuated by the large hand wheel $d^4$. The screw $d^3$ is held against longitudinal movement by the hub of the hand wheel $d^4$, and the flange or shoulder $d^5$ on the screw.

E is a gage which may be set at any distance from the saw A, by clamping at any point along the rod $e$, Fig. 2 and Fig. 3. Of course the gage E and rod $e$, may be swung through the requisite angle to bring the gage in line with the work when it is positioned in the vice jaws.

The carriage C, is actuated by the relative movement between the feed nut, $c^1$ and the feed screw, $f$. $f$ extends through the hollow clamping screw $d^3$; and has the hand wheel $f^2$ attached to it. The nut, $c^1$, is actuated through the spur gears $g\ g^1$, from the shaft G, which is itself actuated from the pulley shaft $b$, through the worm, $g^2$, the worm wheel, $g^3$, and a disconnecting device between said worm wheel and shaft. This train of gearing feeds the saw into the work. The nut, $c^1$, is rotated in the opposite direction and at a higher speed, to retract the saw, this movement being obtained through the spur gears $h\ h^1$, and the bevel gears $h^2\ h^3$. This movement constitutes the quick return.

Both the feed and quick return of the saw are caused by the nut $c^1$ rotating on the screw $f$. This screw is not positively held against rotation with the nut $c^1$, but is only frictionally held. The hub of the crank handle $f^2$, bears against the outer end of the hollow clamping screw $d^3$, and the inner end of this screw $d^3$ is recessed as shown at $d^6$. Within this recess and bearing between the fiber washer against the face on $d^3$, and the washer $f^3$ on the screw $f$, is the short spiral spring $f^4$. More or less tension can be put on the spring $f^4$, by adjusting the crank handle, $f^2$, toward or away from the washer $f^3$. In practice, sufficient tension is put on $f^4$ to hold $f$ stationary during ordinary feeding, but allowing $f$ to readily turn with the nut, and thus stop the feed or quick return, when the nut $c^1$ reaches the end of its travel in either direction. The nut is provided with a projection or lug at each of its ends, $r\ r$, Fig. 1, and these lugs engage the pin, $f^5$ at the end of the feed screw, or the pin, $f^6$ in the washer, $f^3$, according to which end of its travel the carriage has reached. When these lugs and pins engage, the screw and nut travel together, and all travel of the carriage ceases. By this means, the movement of the carriage is automatically stopped, while the machine as a whole continues in movement. This feature obviates the necessity of constant attendance. A very important advantage of this frictional holding of the feed screw lies in the fact that while the feed is thrown in, the saw may be rapidly moved backward or forward by hand, by turning the hand wheel, $f^2$, without stopping to throw the clutch, $g^4$ out and in again.

As the feed nut, $c^1$ is positively driven by the spur gears, $g$ and $g^1$ a full description of how motion is given to shaft, G, will clearly show how $c^1$ is actuated. Loosely splined on shaft, $b$, is the collar, $g^4$, carrying the lug, $g^5$ at one end, and the lug, $g^6$ at the other. Collar, $g^4$ is actuated along the shaft, $b$, by the compound lever, $g^7$ $g^8$. On the worm, $g^2$ is the lug, $g^9$, for engagement by the lug, $g^5$, and on the spur gear, $h$, the lug, $h^4$ is provided for engagement with the lug, $g^6$. The worm, $g^2$, and spur gear, $h$, are idle on shaft $b$, until either one or the other is engaged by the collar, $g^4$, and thus driven by the shaft. The movement given to the carriage on the quick return is a comparatively quick one, and to accommodate the heavy strain of starting, the lug, $h^4$ is on a hub, loose from the periphery of gear, $h$, and connected thereto by the heavy spring, $h^5$.

The feed movement is conveyed from the worm, $g^2$, to the worm wheel, $g^3$. This wheel is without any hub, and the web, $k$, of the wheel, frictionally engages two flanges, $k^1$ and $k^2$, through rings of vulcanized fiber. The friction between these faces is adjusted to the amount necessary to carry the feed, by the nut and spring, $k^3$ $k^4$, acting on the sliding flange, $k^2$. This friction device automatically adjusts the feed. The feed as given by the machine is constant and is rapid, as for a light load.

When the thickness of the material being cut is greater, more teeth of the saw will be engaged, and therefore the load on the saw will be increased. As soon as the load reaches the limit that can be pulled by the friction, the friction slips momentarily, thus reducing the feed for the heavier load. This same automatic adjusting action sometimes takes place between the feed screw and nut $c^1$.

The shaft, G has the disk $m$ shrunk thereon, so that the shaft and disk are practically integral. The sleeve and flange on the left hand end of shaft G, carries what might be termed a crown wheel ratchet, the teeth of which are marked, $t$ $t$ $t$. The disk, $m$ has a groove, $m^1$, milled in it, and in this groove is pivoted the pawl, $p$, on the pin, $p^2$. $p^1$ is a tooth on the end of pawl, $p$, the same width as the ratchet teeth, $t$. The plunger, $p^3$, pressed outward by the spring, $p^4$, throws the pawl, $p$ into engagement with the ratchet teeth on sleeve $k^1$, and as the worm wheel, $g^3$ and ratchet sleeve, $k^1$, are driven to the left to feed,—see arrow in Fig. 6,—the disk $m$ and shaft, G, are carried along with the ratchet sleeve, $k^1$.

The pawl, $p$, has a lug, $p^5$, projecting laterally therefrom, through the slot, $m''$, in the disk, $m$. $p^5$ engages in a hole in the bevel gear, $h^3$ of the quick return train, said bevel gear, $h^3$ being loosely mounted on the shaft G and only coupled therewith by means of the pawl, $p$ and the disk, $m$. When the quick return train is in operation, the gear, $h^3$ is driven to the right, that is, in the opposite direction to the arrow in Fig. 6. In its initial movement to the right, $h^3$ carries the pin or lug, $p^5$, of the pawl, $p$, inwardly, thus compressing the spring, $p^4$, and withdrawing the pawl tooth, $p^1$, from the teeth, $t$ $t$, of the ratchet sleeve, $k^1$. While the quick return train is in gear, the worm, $g^2$ and worm wheel, $g^3$ and ratchet, $k^1$, all remain stationary while the shaft, G, rotates to the right. While the feed train is in gear, the bevel gear, $h^3$, and all the quick return train, including $h$, is slowly driven with the shaft G to the left, that is, in the reverse direction.

The saw, A,—see Figs. 9, 10 and 11,—has its teeth chamfered on alternate sides, see $a$. By this device, the saw blade is much thicker than the cutting edge is wide, which makes the saw stiff under a heavy feed. The chief advantage of this feature, however, lies in the fact that the chips are much narrower than the saw kerf, and have plenty of room to expand and curl as they will, without clogging the saw kerf. In severing the chips, considerable heat is developed, most of which appears to be absorbed by the chips, and as the chips curve they act practically like short cylinders of solid metal. Now if these cylinders fill the saw kerf and expand endwise, it is clear that about one heavy chip would clog the machine. Without this, or some equivalent feature in the saw, a machine of this kind becomes entirely impractical, as its feed is too slow.

What I claim as my invention is,—

1. In a metal sawing machine, a frame, a carriage thereon, a normally stationary feed screw mounted on the frame, a feed nut rotatable in the carriage, means for rotating said nut, and means whereby the feed screw is rotated with the nut when the saw has reached the limit of its travel in either direction.

2. In a metal sawing machine, a saw arbor, a feed shaft therefor, a shaft to which power is applied, speed reducing spur gearing between said power shaft and the saw arbor, a worm on said power shaft, a worm wheel engaging said worm, said worm wheel having a web engaging between friction flanges to the feed shaft, disengageable means connecting the friction flanges to the feed shaft, a quick return gearing for driving the feed shaft in the opposite direction, and means for causing said quick return gearing to automatically disengage said connecting means.

3. In a metal sawing machine, a screw and friction train of gearing for feeding, a spur and bevel train of gearing for the quick return, a pawl pivoted on the feed shaft, and automatically engaging the friction gearing while feeding, a lug on said pawl engaging an element of the quick return, whereby the pawl is automatically disengaged from the friction gearing when the return train is thrown in operation.

4. A metal sawing machine, comprising a frame, a carriage mounted thereon, a suitably driven saw carried by the carriage, a feed screw rotatably mounted on the frame, a spring pressed washer frictionally held against the feed screw to normally prevent the rotation thereof, a nut on the carriage threaded on the feed screw, means for turning the nut, and means for locking the nut with the washer so that the feed screw turns with the nut to stop further feed of the carriage.

5. A metal sawing machine, comprising a frame, a carriage mounted thereon, a suitably driven saw carried by the carriage, a feed screw rotatably mounted on the frame, a spring pressed washer frictionally held against the feed screw to normally prevent the rotation thereof, a nut on the carriage threaded on the feed screw, means for turning the nut, means for locking the nut with the washer so that the feed screw turns with the nut to stop further feed of the carriage, and means for locking the nut with the feed screw when the nut is at the other end of its movement on the feed screw.

6. A metal sawing machine, comprising a frame, a carriage mounted thereon, a saw carried by the carriage, a drive shaft, a worm loosely mounted on the drive shaft, a screw and nut feed connection between the carriage and the frame, a feed shaft geared to the said feed connection, a worm wheel on the feed shaft frictionally held against rotation independent thereof and meshing with the worm, a quick return feed gearing between the drive shaft and the feed shaft, a clutch on the drive shaft for engaging either the worm or the quick return gearing, and a ratchet connection between the quick return gearing and the feed shaft.

7. A metal sawing machine, comprising a frame, a carriage mounted thereon, a saw carried by the carriage, a drive shaft, a worm loosely mounted on the drive shaft, a screw and nut feed connection between the carriage and the frame, a feed shaft geared to the said feed connection, a flange on the feed shaft, a spring pressed flange loosely mounted on the feed shaft, a worm wheel frictionally held between the said flanges and meshing with the worm, a quick return feed gearing between the drive shaft and the feed shaft, a clutch on the drive shaft for engaging either the worm or the quick return feed gearing, and a ratchet connection between the quick return feed gearing and the feed shaft.

8. A metal sawing machine, comprising a frame, a carriage mounted thereon, a saw carried by the carriage, a drive shaft, a worm loosely mounted on the drive shaft, a screw and nut feed connection between the carriage and the frame, a feed shaft geared to said feed connection, a fixed flange on the feed shaft, a spring pressed flange loosely mounted on the feed shaft, a worm wheel frictionally held between the two flanges and meshing with the worm, a quick return feed gearing between the drive shaft and the feed shaft, a clutch on the drive shaft for engaging either the worm or the quick return feed gearing, the quick return feed gearing terminating in a pinion loose on the feed shaft, a disk fixed on the feed shaft, teeth on the fixed flange of the feed shaft, a spring pressed pawl pivoted to the disk and adapted to engage said teeth, and a connection between the pawl and the pinion, whereby the reverse movement of the pinion when the clutch engages the quick return feed gearing causes the pawl to disengage the teeth of the flange, said pawl constituting a connecting means between the quick return feed gearing and the feed shaft.

9. A metal sawing machine, comprising a frame, a carriage mounted thereon, a saw carried by the carriage, a drive shaft, a screw and nut feed connection between the carriage and the frame, a clutch on the drive shaft, a feed shaft geared to the said feed connection, a feed gearing connected with the feed shaft and adapted to be engaged by the clutch, and a quick return feed gearing connected to the feed shaft, one of the gears of said quick return feed gearing having a loose spring connected hub also adapted to be engaged by the clutch.

10. A metal sawing machine, comprising a frame, a carriage mounted thereon, a saw carried by the carriage, a screw and nut feed connection between the carriage and the frame, a feed shaft geared to the screw and nut feed connection, a drive shaft, a clutch thereon, a worm on the drive shaft adapted to be engaged by the clutch, a worm wheel meshing with the worm, a pawl and ratchet connection between the worm wheel and the drive shaft, a quick return feed gearing also adapted to be engaged by the clutch and having connection with the feed shaft by means of the pawl, whereby the reverse operation of the quick return feed gearing causes the pawl to disengage the ratchet and become the operative connection for the quick return feed gearing.

In testimony whereof, I have signed my name to this specification in the presence of two witnesses.

PAUL W. POST.

Witnesses:
 E. B. SYMONS,
 J. E. HUTCHINSON.